US011446807B2

United States Patent
Jhang et al.

(10) Patent No.: US 11,446,807 B2
(45) Date of Patent: Sep. 20, 2022

(54) SUPPORT MECHANISM

(71) Applicant: Industrial Technology Research Institute, Hsin-Chu (TW)

(72) Inventors: Bo-Jyun Jhang, Taichung (TW); Wei-Juh Lin, Taichung (TW); Wei-Tse Lin, Taichung (TW); Pei-Yin Chen, Taichung (TW); Chien-Chih Liao, Taichung (TW); Chun-Ting Chen, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 499 days.

(21) Appl. No.: 16/580,340

(22) Filed: Sep. 24, 2019

(65) Prior Publication Data

US 2021/0031356 A1    Feb. 4, 2021

(30) Foreign Application Priority Data

Jul. 29, 2019   (TW) .................................. 108126779

(51) Int. Cl.
*B23Q 3/10* (2006.01)
*B25H 1/16* (2006.01)
(Continued)

(52) U.S. Cl.
CPC ................. *B25H 1/16* (2013.01); *B23Q 1/26* (2013.01); *B23Q 1/703* (2013.01); *B23Q 3/107* (2013.01);
(Continued)

(58) Field of Classification Search
CPC ........ B23Q 3/107; B23Q 3/106; B23Q 1/703; B23Q 1/26; B23Q 1/4828; F16M 11/2014; F16M 11/28
See application file for complete search history.

(56) References Cited

U.S. PATENT DOCUMENTS 4,655,567 A * 4/1987 Morley .................. F16M 11/18
396/419
4,860,438 A * 8/1989 Chen .................. H05K 13/0409
294/183
(Continued)

FOREIGN PATENT DOCUMENTS

CN    102581646 A    7/2012
CN    104439558 A    3/2015
(Continued)

OTHER PUBLICATIONS

TW OA issued on Aug. 24, 2020.

*Primary Examiner* — Bradley Duckworth
(74) *Attorney, Agent, or Firm* — WPAT, PC (57) ABSTRACT

A support mechanism includes a fixed body, a rotating unit, a moving unit and a driving unit. The rotating unit is rotationally mounted to the fixed body. The moving unit, disposed at the fixed body, includes a ball screw spline shaft, a ball screw nut and a ball spline nut. The ball screw nut and the ball spline nut are both rotatably disposed at the ball screw spline shaft moved together with the rotating unit. The driving unit, disposed at the fixed body, includes a first driving member and a second driving member to rotate the ball screw nut and the ball spline nut, respectively. With different rotation pairs of the ball screw nut and the ball spline nut to the ball screw spline shaft, the ball screw spline shaft is driven to move, and the ball screw spline shaft is further to move the rotating unit.

13 Claims, 4 Drawing Sheets

(51) Int. Cl.
*F16M 11/10* (2006.01)
*F16M 11/28* (2006.01)
*F16M 11/04* (2006.01)
*F16M 11/18* (2006.01)
*F16M 13/02* (2006.01)
*F16M 11/20* (2006.01)
*B23Q 1/70* (2006.01)
*B23Q 1/26* (2006.01)

(52) U.S. Cl.
CPC ............ *F16M 11/041* (2013.01); *F16M 11/10* (2013.01); *F16M 11/18* (2013.01); *F16M 11/2014* (2013.01); *F16M 11/28* (2013.01); *F16M 13/022* (2013.01); *F16M 2200/021* (2013.01)

(56) References Cited

U.S. PATENT DOCUMENTS

| | | | | |
|---|---|---|---|---|
| 4,939,946 | A * | 7/1990 | Teramachi | F16D 3/065 74/89.3 |
| 5,327,795 | A * | 7/1994 | Katahira | G05B 19/19 74/89.3 |
| 5,364,083 | A | 11/1994 | Ross et al. | |
| 5,554,899 | A * | 9/1996 | Teramachi | B25J 18/02 310/20 |
| 8,079,578 | B2 | 12/2011 | Bumgarner et al. | |
| 8,534,633 | B2 | 9/2013 | Tell | |
| 9,776,329 | B2 | 10/2017 | Kai et al. | |
| 10,913,147 | B2 * | 2/2021 | Adachi | B25J 9/0018 |
| 2005/0015962 | A1 | 1/2005 | Sturm, Jr. et al. | |
| 2005/0160855 | A1 * | 7/2005 | Aida | F16H 25/2018 74/424.92 |
| 2007/0272727 | A1 | 11/2007 | Yang | |
| 2009/0057971 | A1 | 3/2009 | Bumgarner et al. | |
| 2016/0176001 | A1 | 6/2016 | Rinaldi | |
| 2017/0216998 | A1 | 8/2017 | Rinaldi | |
| 2020/0306962 | A1 * | 10/2020 | Kawai | B25J 17/0241 |

FOREIGN PATENT DOCUMENTS

| | | |
|---|---|---|
| CN | 103358251 B | 11/2015 |
| CN | 206066066 U | 4/2017 |
| TW | 365203 | 7/1999 |
| TW | M372409 | 1/2010 |
| TW | I498188 | 9/2015 |
| TW | M527374 | 8/2016 |
| TW | I587968 | 6/2017 |
| TW | I642499 | 12/2018 |

* cited by examiner

SUPPORT MECHANISM

CROSS REFERENCE TO RELATED APPLICATION

This application claims the benefits of Taiwan application Serial No. 108126779, filed on Jul. 29, 2019, the disclosures of which are incorporated by references herein in its entirety.

TECHNICAL FIELD

The present disclosure relates in general to a support mechanism for supporting a workpiece.

BACKGROUND

Composite materials are generally featured in light weights and high strengths, and thus widely applied to versatile fields such as the aerospace industry, the vehicle industry and the vessel industry. A typical workpiece made of the composite material is produced by laminating, thermal pressing and machining, in which the machining is usually performed by a machine tool. During the machining, a fixed fixture is mainly applied as a support mechanism for auxiliary positioning the workpiece, for which lots of time would be costed for uploading or downloading the workpiece.

Furthermore, while in machining a large-scale part such as parts of the vessel or aerospace industry, the demand in the fixtures is extremely huge, and thus the machining cost is too high to be reduced. In addition, the storage of these fixed fixtures needs a bigger space. Therefore, these kinds of conventional support mechanisms usually have disadvantages of higher prices, smaller rotation angles, less flexibility, excessive heights of the machine tools and so on.

In addition, the workpiece made of the composite material is usually produced to have a curve surface, and thus the support mechanism needs to be curved so as to match the curved workpiece, such that a stable support can be thus provided. Nevertheless, a universal joint is usually applied to join the conventional support mechanism with a suction cup. Obviously, the suction means is passive to conform the curved surface of the workpiece. Since the workpiece is passively but freely sucked by the suction cup, thus the suction cup might be forced to displace upon when the workpiece is depressed. Thereupon, the following machining upon the workpiece made of the composite material may be deviated to a degree that stable adhering of the suction cup at the curved surface of the workpiece would be impossible. Hence, it is inevitable that the aforesaid passive suction means needs another force to adjust the angling of the workpiece. Empirically, this suction means wastes both labors and time, and it is not usual that vacuum piping for the suction cup might fail to produce a vacuum environment inside the suction cup if the forced rotation angle is significant.

Accordingly, an improved support mechanism to overcome the aforesaid shortcomings is urgent and welcome to the skill in the art.

SUMMARY

An object of the present disclosure is to provide a support mechanism that can still adjust the rotation angle and elevation (i.e., the triaxial freedom) even when the number of driving units is reduced. In addition, the support mechanism of this disclosure is featured in high flexibility to match workpieces with different heights or curved surfaces, and thus swift clamping and positioning upon the workpiece provided by the support mechanism of this disclosure can be obtained. Thereupon, the support mechanism of this disclosure can stably support the workpiece, even that the height of the support mechanism is reduced.

In one embodiment of this disclosure, a support mechanism includes a fixed body member, a rotating unit, a moving unit and a driving unit. The rotating unit, mounted to the fixed body member, is used for rotating with respect to the fixed body member. The moving unit, disposed at the fixed body member, includes a ball screw spline shaft, a ball screw nut and a ball spline nut, in which the ball screw nut is rotatably disposed at the ball screw spline shaft, the ball spline nut is rotatably disposed also at the ball screw spline shaft, and the ball screw spline shaft is moved together with the rotating unit. The driving unit, disposed at the fixed body member, includes a first driving member and a second driving member, in which the first driving member is to rotate the ball screw nut, and the second driving member is to rotate the ball spline nut. With different rotation pairs of the ball screw nut and the ball spline nut to the ball screw spline shaft, the ball screw spline shaft is driven to move, and the ball screw spline shaft is further to move the rotating unit.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and units are schematically shown in order to simplify the drawing.

Figure 1:
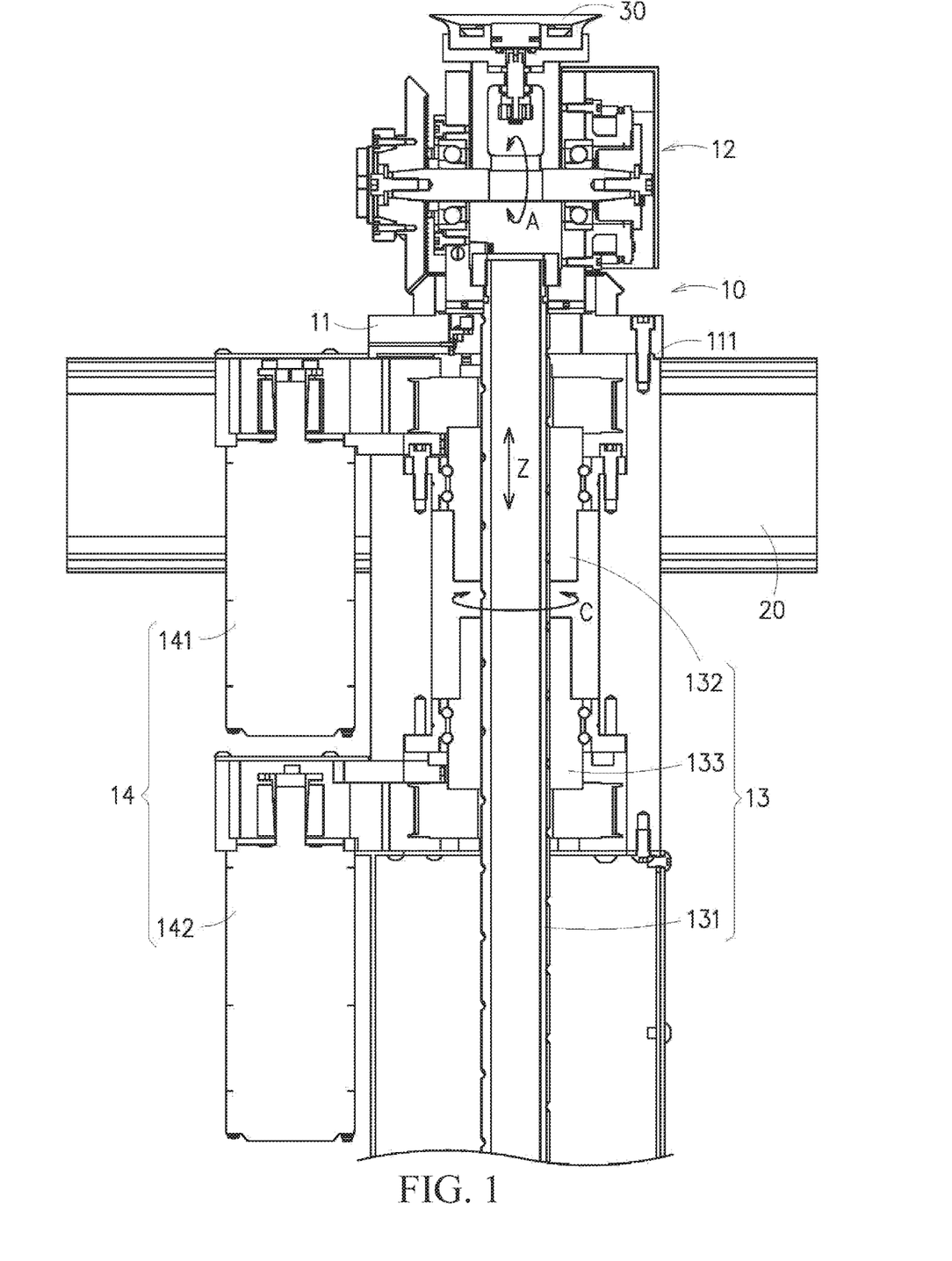
FIG. 1 is a schematic cross-section view of an embodiment of the support mechanism in accordance with this disclosure, engaged at a frame.

FIG. 1 is a schematic cross-section view of an embodiment of the support mechanism 10 in accordance with this disclosure, engaged at a frame. As shown, in this embodiment, the support mechanism 10 can be applied as a fixation structure, a clamping structure or a spindle of a gantry processing machine for large-scale parts of vessels, aircrafts and the like. The support mechanism 10 includes a fixed body member 11, a rotating unit 12, a moving unit 13 and a driving unit 14. In this embodiment, the fixed body member 11 has at least a position structure 111, formed as a protrusion at a bottom of the fixed body member 11. The position structure 111 can fit the frame 20, and fasteners can be applied to fix the fixed body member 11 to the frame 20. A plurality of stands (not shown in the figure) can be used to stand and anchor the frame 20 on the ground. In an embodiment not shown here, one single frame 20 can pair at least one support mechanism 10 to support the large-scale part. However, this disclosure is not limited to the aforesaid embodiments, and details for any feasible embodiment of the support mechanism 10 are determined according to practical requirements.

In this embodiment, the moving unit 13 is disposed at the fixed body member 11, and the fixed body member 11 is located between the rotating unit 12 and the moving unit 13. The driving unit 14, disposed also at the fixed body member 11, is located aside to the moving unit 13. Namely, the rotating unit 12 is located above the fixed body member 11, and both the driving unit 14 and the moving unit 13 are located under the rotating unit 12 (referring to FIG. 1). Upon such an arrangement, in an axial direction of the rotating unit 12 (i.e., a vertical direction Z), the driving unit 14 and the moving unit 13 are paired into a left-right parallel arrangement, not an axial arrangement, such that the height of the support mechanism 10 can be reduced.

Figure 4:
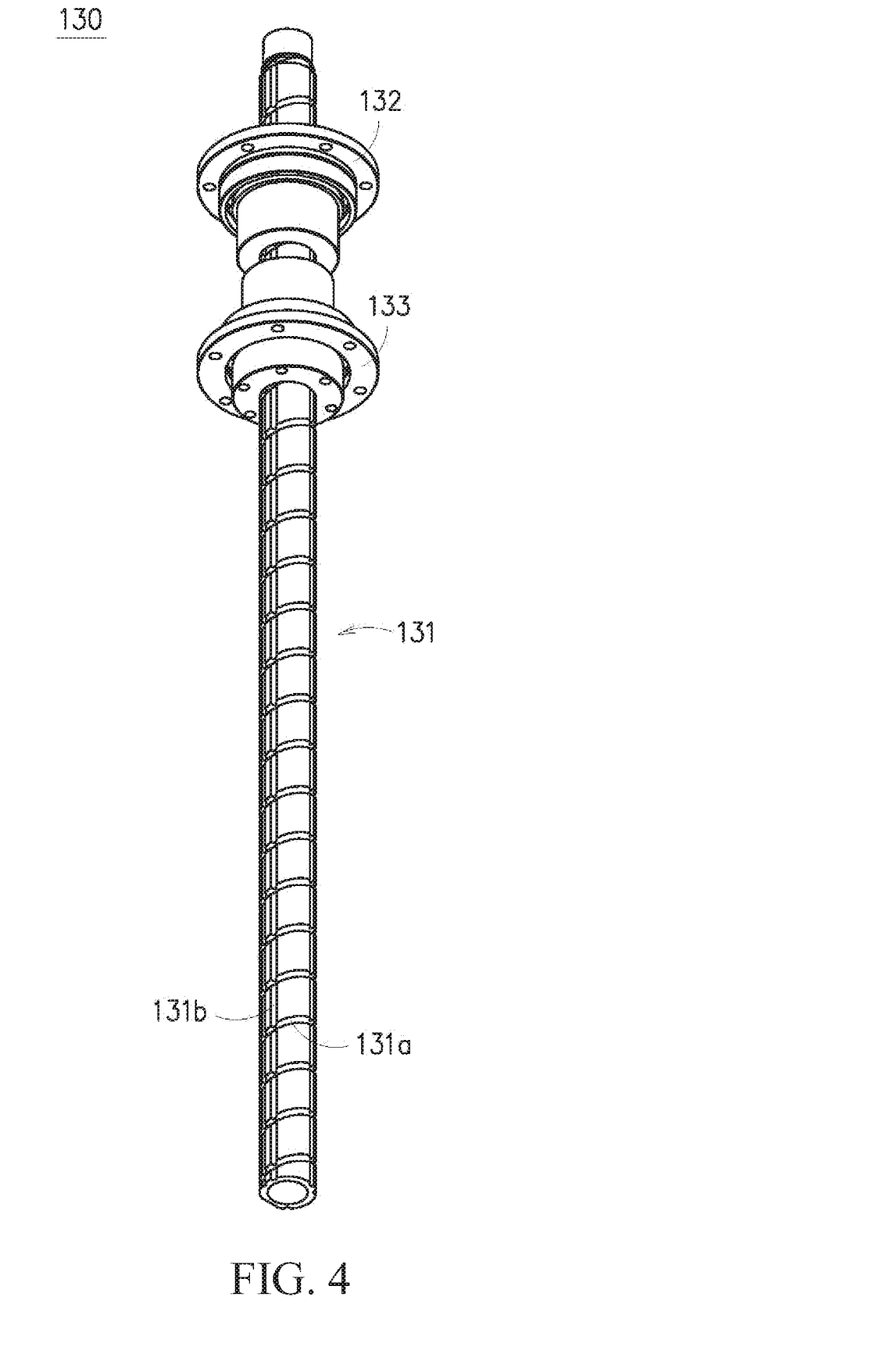
FIG. 4 is a schematic perspective view of a ball spline in accordance with this disclosure.

In this embodiment, the rotating unit 12, mounted to the fixed body member 11, can rotate in a first rotation direction A over the fixed body member 11. Referring to FIG. 4, the moving unit 13 includes a ball spline 130 consisted of at least a ball screw spline shaft 131, a ball screw nut 132 and a ball spline nut 133. One end of the ball screw spline shaft 131 is to rotate the rotating unit 12, and an axial direction of the ball screw spline shaft 131 is parallel to the axial direction of the driving unit 14 (not shown in the figure, but parallel to the vertical direction Z). Namely, the ball screw spline shaft 131 and the driving unit 14 are paired into the parallel arrangement. In other words, the axial direction of the ball screw spline shaft 131 (not shown in the figure, but parallel to the vertical direction Z) and the axial direction of the driving unit 14 are not collinear. The ball screw nut 132 is rotatably disposed at one end of the ball screw spline shaft 131, while the ball spline nut 133 is rotatably disposed at another end of the ball screw spline shaft 131. Obviously, in this embodiment, two different types of the screw nuts are rotatably disposed to opposing ends (upper and lower) of the ball screw spline shaft 131. However, according to this disclosure, positions of these two screw nuts are not specifically limited to the aforesaid embodiments.

In this embodiment, the driving unit 14 includes a first driving member 141 (for example, an electric motor) and a second driving member 142 (for example, another electric motor). The first driving member 141 rotates the ball screw nut 132 via a belt (not shown in the figure), and the second driving member 142 rotates the ball spline nut 133 via another belt (not shown in the figure). By rotating the ball screw nut 132 and/or the ball spline nut 133, the ball screw spline shaft 131 can be further rotated. In other words, the ball screw nut 132 itself can drive the ball screw spline shaft 131, and the ball spline nut 133 can also drive the ball screw spline shaft 131 by itself. Also, the ball screw nut 132 and the ball spline nut 133 can be applied simultaneously to drive the ball screw spline shaft 131. In this embodiment, with two different types of the screw nuts to form an upper-lower rotation pair for the ball screw spline shaft 131 and to drive the ball screw spline shaft 131 to undergo up-and-down motion and rotation, the ball screw spline shaft 131 can further drive the rotating unit 12 to move in the axial direction of the ball screw spline shaft 131, and thereby the rotation angle of the rotating unit 12 in the first rotation direction A with respect to the fixed body member 11 can be varied. It shall be explained that the rotating unit 12 is rotated in the axial direction of the ball screw spline shaft 131. For example, the rotating unit 12 can rotate about the ball screw spline shaft 131 in the second rotation direction C, or the rotating unit 12 can displace up or down along the ball screw spline shaft 131 in the vertical direction Z.

As described above, in this embodiment, any rotation pair for the ball screw spline shaft 131 consisted of two different kinds of screw nuts can be used to move the ball screw spline shaft 131. For example, the first driving member 141 drives the ball screw nut 132 to rotate about the ball screw spline shaft 131. Then, the ball screw spline shaft 131 would displace axially in the vertical direction Z, and thereby the rotating unit 12 would displace with the ball screw spline shaft 131 so as to adjust a relative vertical distance between the rotating unit 12 and the fixed body member 11.

In another embodiment, the first driving member 141 drives the ball screw nut 132 to rotate, and simultaneous the second driving member 142 drives the ball spline nut 133 to rotate, so that the ball screw nut 132 and the ball spline nut 133 can rotate about the ball screw spline shaft 131 synchronously. In other words, the ball screw nut 132 and the ball spline nut 133, having the same rotation speed, drive the screw spline shaft 131 to rotate in the second rotation direction C. The rotating unit 12 would rotate with the ball screw spline shaft 131, i.e., about the ball screw spline shaft 131 in the second rotation direction C.

In s further embodiment, the second driving member 142 rotates the ball spline nut 133 about the ball screw spline shaft 131, so that the ball screw spline shaft 131 would undergo a screw motion along the ball screw spline shaft 131 axially. Also, the ball screw spline shaft 131 would drive the rotating unit 12 to undergo the screw motion with respect to the fixed body member 11. Here, the screw motion is a combined motion including the rotation of the ball screw spline shaft 131 in the second rotation direction C and the up-and-down lifting motion of the ball screw spline shaft 131 in the vertical direction Z, which will form a spiral trace standing for the up-and-down moving path.

Upon such an arrangement of this embodiment, the support mechanism 10 does not need three driving units anymore, but utilizes specific structure arrangement to reduce the number of the driving units. In this embodiment, only two driving units are enough to adjust the triaxial freedom (the first rotation direction A, the second rotation direction C and the vertical direction Z). Thereupon, workpieces with different heights and curved surfaces can be firmly and stably supported by the support mechanism 10 of this disclosure.

Figure 2:
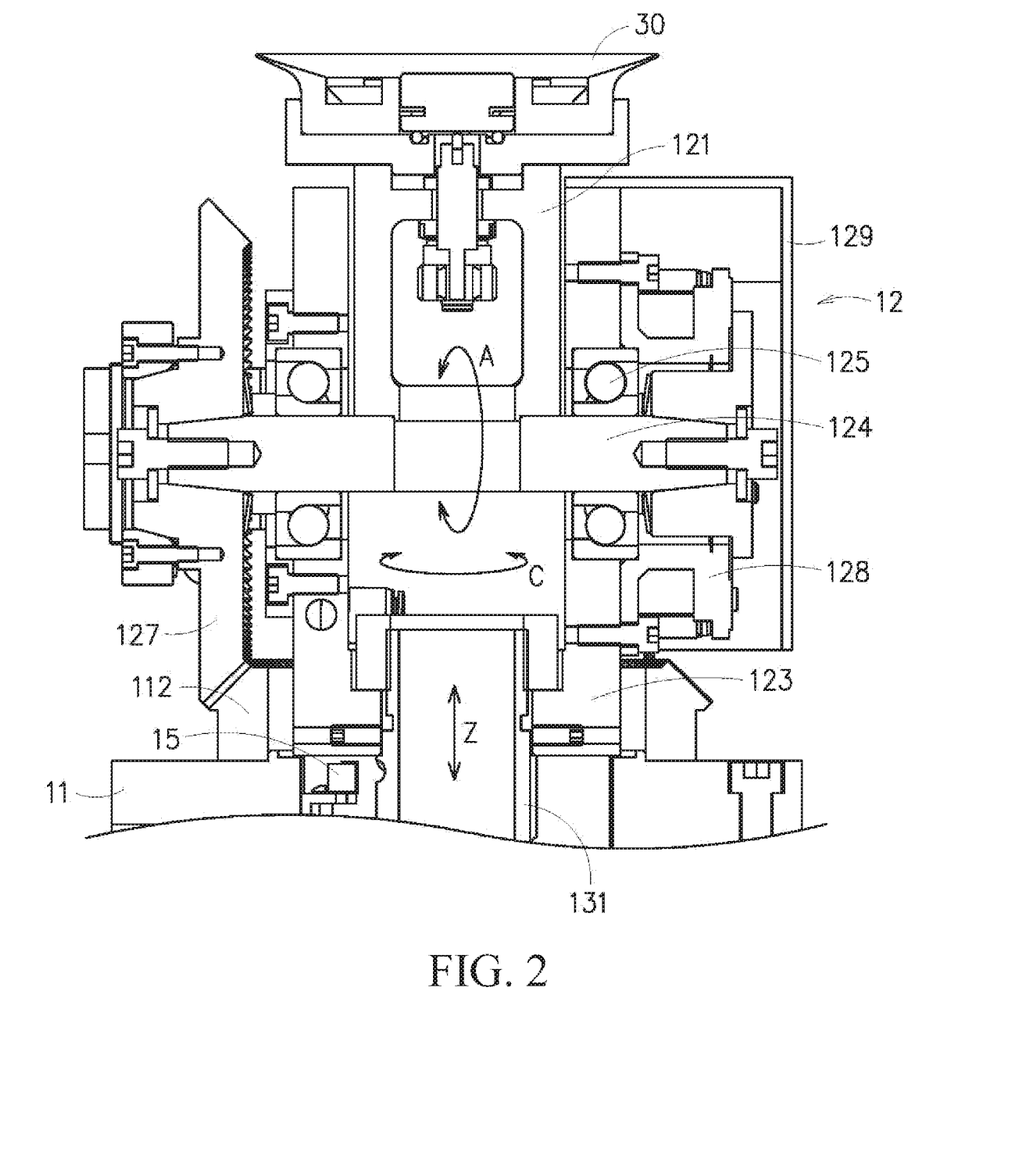
FIG. 2 is a schematic enlarged view of the rotating unit and the supportive element of FIG. 1.

FIG. 2 is a schematic enlarged view of the rotating unit 12 and the supportive element 30 of FIG. 1. As shown in FIG. 1 and FIG. 2, the fixed body member 11 includes a first bevel gear 112 fixedly mounted to a surface of the fixed body member 11. Namely, the first bevel gear 112 is stationary with respect to the fixed body member 11.

In this embodiment, the rotating unit 12 includes a main body 121, a supportive base 123, a rotational shaft 124, a plurality of bearing elements 125, a second bevel gear 127, a brake element 128 (for example, Taiwan Patent Publication No. I378842) and a housing 129. It shall be explained that the housing 129 in the figure is only a demonstrative model, not used to limit the scope of this disclosure. In some other embodiments, the support mechanism 10 can exclude the housing. In this embodiment, the rotational shaft 124 penetrates the supportive base 123, and the bearing elements 125 are to sleeve both ends of the rotational shaft 124. The main body 121 engages the supportive base 123 and the rotational shaft 124 via the respective bearing elements 125. The rotational shaft 124 can be driven to rotate by theee second bevel gear 127, such that the main body 121 can rotate about the rotational shaft 124, i.e., in a direction parallel to the first rotation direction A. The ball screw spline shaft 131 penetrates the fixed body member 11, and one end of the ball screw spline shaft 131 is connected with the supportive base 123, such that the ball screw spline shaft 131 and the rotating unit 12 can move as a unique piece. In addition, the axial direction of the rotational shaft 124 is perpendicular to the axial direction of the ball screw spline shaft 131.

In this embodiment, one end of the rotational shaft 124 penetrates the second bevel gear 127, while another end of the rotational shaft 124 is connected with the brake element 128. Namely, opposing ends of the rotational shaft 124 are to couple the second bevel gear 127 and the brake element 128, respectively. The housing 129 shields the brake element 128, part of the rotational shaft 124 and the respective bearing elements 125, in which the axial direction of the first bevel gear 112 (not shown in the figure) is perpendicular to the axial direction of the second bevel gear 127 (also not shown in the figure), the axial direction of the first bevel gear 112 is parallel to the axial direction of the ball screw spline shaft 131, and the axial direction of the second bevel gear 127 is parallel to the axial direction of the rotational shaft 124. In this embodiment, the second bevel gear 127 is used for meshing the stationary first bevel gear 112. When the rotating unit 12 and the ball screw spline shaft 131 are rotated together in the second rotation direction C, and when the second bevel gear 127 meshing the first bevel gear 112 is rotated simultaneously, the second bevel gear 127 would drive the rotational shaft 124 to rotated as well, such that the main body 121 can rotate about the rotational shaft 124 in the first rotation direction A with respect to the fixed body member 11. On the other hand, the brake element 128 is used for holding firmly the rotational shaft 124 so as to stop the rotation of the main body 121 about the rotational shaft 124 in the first rotation direction A with respect to the fixed body member 11. Thereupon, the rotating unit 12 can be fixed at a specific rotation angle with respect to the fixed body member 11.

In this embodiment, the support mechanism 10 further includes a detecting element 15 such as a proximity sensor. The detecting element 15, connected with the fixed body member 11, is used for determining whether or not the first bevel gear 112 is meshed with the second bevel gear 127. If the second bevel gear 127 does not mesh the first bevel gear 112, then the ball screw spline shaft 131 would undergo the up-and-down lifting motion in the vertical direction Z, and the supportive base 123 of the rotating unit 12 synchronously moved with the ball screw spline shaft 131 would undergo simultaneously the up-and-down lifting motion in the vertical direction Z, so that the relative vertical distance between the rotating unit 12 and the fixed body member 11 would be continuously adjusted till the second bevel gear 127 meshes the first bevel gear 112.

In addition, as shown in FIG. 1 and FIG. 2, a supportive element 30, connected to the main body 121 of the rotating unit 12, is moved synchronously with the rotating unit 12. For example, when the second bevel gear 127 rotates to drive the rotational shaft 124 to rotate, the main body 121 is driven synchronously, so that the main body 121 can drive the supportive element 30 to rotate about the rotational shaft 124 in the first rotation direction A. Thereupon, the supportive element 30 is thus able to rotate in the first rotation direction A. In some other embodiments, when the ball screw spline shaft 131 rotates axially in the second rotation direction C, the supportive base 123 is driven simultaneously, so that the rotating unit 12 can rotate synchronously about the ball screw spline shaft 131 in the second rotation direction C. Thereupon, the supportive element 30 is thus able to rotate in the second rotation direction C. In another situation, when the ball screw spline shaft 131 undergoes the up-and-down lifting motion in the vertical direction Z, the supportive base 123 of the rotating unit 12 would displace simultaneously, so that the rotating unit 12 can undergo the up-and-down lifting motion synchronously with the ball screw spline shaft 131 in the vertical direction Z. Thereupon, the supportive element 30 is thus able to perform the up-and-down lifting motion in the vertical direction Z.

Upon such an arrangement, the supportive element 30 is able to move in all the first rotation direction A, the second rotation direction C and the vertical direction Z (i.e., the triaxial freedom) via the support mechanism, such that workpieces with different heights and curved surfaces can be rapidly and fixedly positioned. In exemplary examples, the supportive element 30 can be a suction cup, an electromagnetic valve, an electromagnet, or any the like with a soft vacuum suction structure and a solid supportive lower base. Thereupon, while the vacuum piping works, the elasticity of the suction structure itself would provide pulling to hold firmly the workpiece, and the solid supportive structure provided by the lower base would supply the workpiece with more supportive contact area, so that sufficient supportive forcing can be provided to sustain and hold firmly the large-scale workpiece usually having a heavier height. However, this disclosure does not limit the embodiment of the supportive element 30. In an embodiment not shown in the figure, the supportive element can be a claw. Through the support mechanism of this disclosure having freedoms in all the first rotation direction A, the second rotation direction C and the vertical direction Z (i.e., the triaxial freedom), the claw can hold or grasp the workpieces with different heights and curved surfaces.

Figure 3:
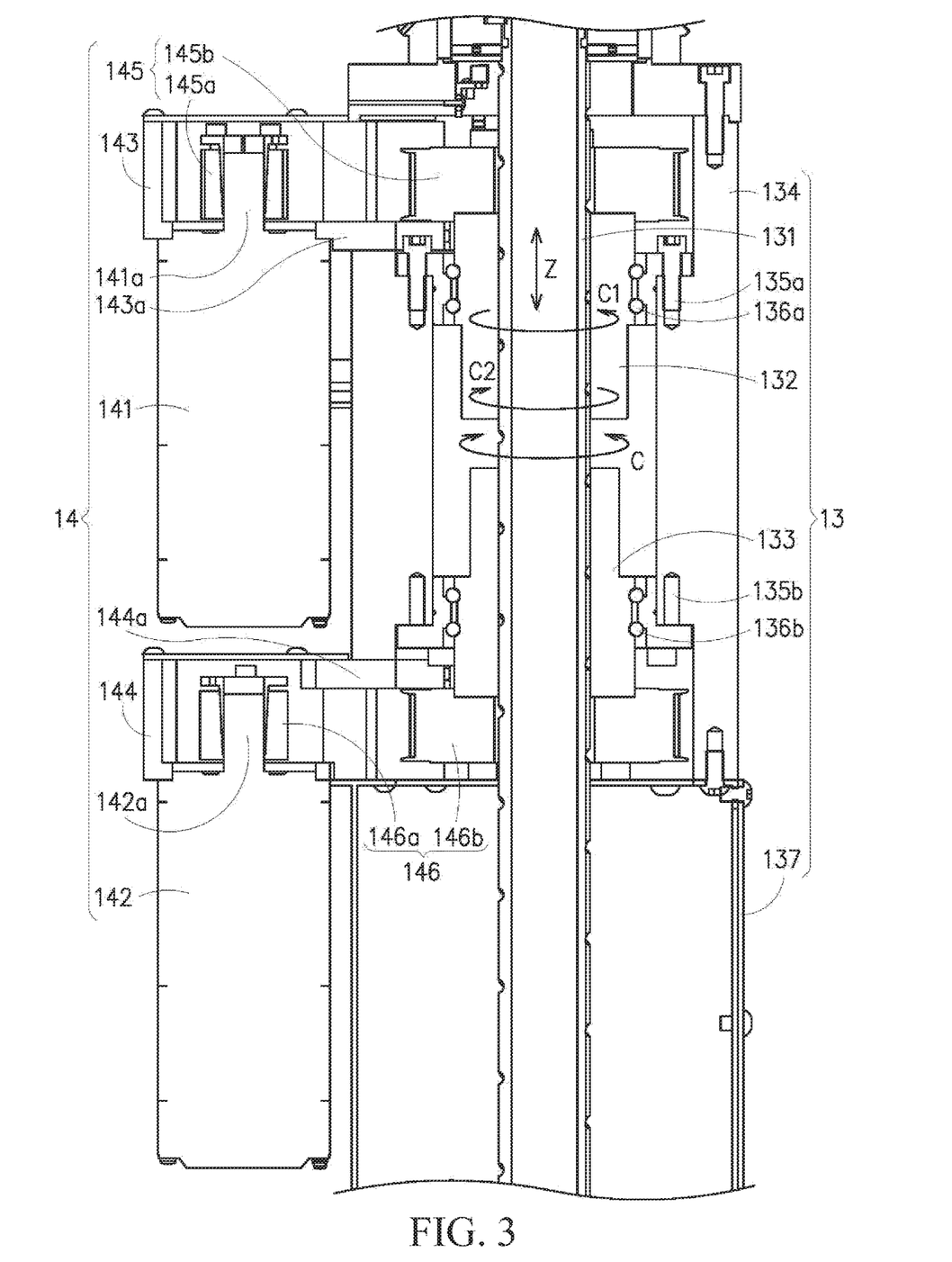
FIG. 3 is a schematic enlarged view of the moving unit and the driving unit of FIG. 1.

FIG. 3 is a schematic enlarged view of the moving unit 13 and the driving unit 14 of FIG. 1, and FIG. 4 is a schematic perspective view of a ball spline 130 in accordance with this disclosure. Referring to FIG. 1 through FIG. 4, the moving unit 13 includes the ball spline 130 consisted of the ball screw spline shaft 131, the ball screw nut 132 and the ball spline nut 133, and additionally the moving unit 13 further includes a screw nut fixation base 134, a first fastener 135a, a second fastener 135b, a first bearing element 136a, a second bearing element 136b and a lower base 137. One end of the screw nut fixation base 134 is fixed to the fixed body member 11 via fasteners, while another end thereof screw nut fixation base 134 is connected to the lower base 137.

In this embodiment, the ball screw spline shaft 131, movably mounted inside the screw nut fixation base 134, has one end protruding out of the screw nut fixation base 134 to connect the supportive base 123 so as to move together the rotating unit 12, while another end of the ball screw spline shaft 131 penetrates the lower base 137. An upper flange of the ball screw nut 132 is fixed to the screw nut fixation base 134 via the first fasteners 135a, and the first bearing element 136a is disposed between the ball screw nut 132 and the screw nut fixation base 134 so as to enable the ball screw nut 132 to rotate about the ball screw spline shaft 131. A lower flange of the ball spline nut 133 is fixed to the screw nut fixation base 134 via the second fasteners 135b, and the second bearing element 136b is disposed between the ball spline nut 133 and the screw nut fixation base 134 so as to enable the ball spline nut 133 to rotate about the ball screw spline shaft 131.

Practically, as shown in FIG. 4, an outer surface of the ball screw spline shaft 131 includes a spiral groove 131a and a linear groove 131b. When the first driving member 141 rotates the ball screw nut 132, the ball screw nut 132 would follow the linear groove 131b to displace. Since the upper flange of the ball screw nut 132 is fixed to the screw nut fixation base 134, thus the ball screw spline shaft 131 would be driven to undergo the up-and-down lifting motion along the ball screw spline shaft 131 in the vertical direction Z. When the second driving member 142 drives the ball spline nut 133 to rotate along the spiral groove 131a. Since the lower flange of the ball spline nut 133 is fixed to the screw nut fixation base 134, thus the ball screw spline shaft 131 would undergo a screw motion along the ball screw spline shaft 131.

In this embodiment, the driving unit 14 includes the first driving member 141 and the second driving member 142, and further includes a first fixation base 143, a second fixation base 144, a first transmission element 145 and a second transmission element 146. The first driving member 141 and the second driving member 142 can be motors. The first driving member 141 includes a first shaft portion 141a, and the second driving member 142 includes a second shaft portion 142a. The first driving member 141 is connected with the first fixation base 143, with the first shaft portion 141a disposed inside the first fixation base 143. The first connection portion 143a of the first fixation base 143 is connected to an exterior of the screw nut fixation base 134. The axial direction of the first shaft portion 141a is parallel to the axial direction of the ball screw spline shaft 131. Namely, the first shaft portion 141a of the first driving member 141 and the ball screw spline shaft 131 are paired into a parallel arrangement. In other words, the axial directions for the ball screw spline shaft 131 and the first shaft portion 141a of the first driving member 141 are not collinear. The second driving member 142 is connected with the second fixation base 144, with the second shaft portion 142a disposed inside the second fixation base 144. The second connection portion 144a of the second fixation base 144 is connected to the exterior of the screw nut fixation base 134. The axial direction of the second shaft portion 142a is parallel to the axial direction of the ball screw spline shaft 131. Namely, the second shaft portion 142a of the second driving member 142 and the ball screw spline shaft 131 are paired into a parallel arrangement. In other words, the axial directions for the ball screw spline shaft 131 and the second shaft portion 142a of the second driving member 142 之 output shaft ( ) 之 axial direction are not collinear.

In this embodiment, the first transmission element 145, connecting the first shaft portion 141a of the first driving member 141 to the ball screw nut 132, can be a power transmission mechanism such as a combination of belts and pulleys. The first transmission element 145 includes a first shaft portion pulley 145a and a first screw nut pulley 145b. The first shaft portion pulley 145a sleeves the first shaft portion 141a of the first driving member 141, and the first screw nut pulley 145b sleeves the ball screw nut 132. The belt (not shown in the figure) can circle the first shaft portion pulley 145a and the first screw nut pulley 145b so as to form the power transmission mechanism. Similarly, the second transmission element 146, connecting the second shaft portion 142a of the second driving member 142 to the ball spline nut 133, can be a combination of belts and pulleys as a power transmission mechanism. The second transmission element 146 includes a second shaft portion pulley 146a and a second screw nut pulley 146b. The second shaft portion pulley 146a sleeves the second shaft portion 142a of the second driving member 142, and the second screw nut pulley 146b sleeves the ball spline nut 133. The belt (not shown in the figure) can circle the second shaft portion pulley 146a and the second screw nut pulley 146b so as to form the power transmission mechanism. However, this disclosure does not limit the embodiments of the transmission element.

Upon such an arrangement, by having the first driving member 141 to rotate the first shaft portion 141a of the first driving member 141 so as to rotate the first transmission element 145 as well, the first shaft portion pulley 145a of the first transmission element 145 would be rotated to drive the belt, and simultaneously the belt would further rotate the first screw nut pulley 145b so as to rotate the ball screw nut 132 as well, such that the ball screw nut 132 and the first shaft portion 141a of the first driving member 141 can rotate synchronously.

Similarly, by having the second driving member 142 to rotate the second shaft portion 142a of the second driving member 142 so as to rotate the second transmission element 146 as well, the second shaft portion pulley 146a of the second transmission element 146 would be rotated to drive the belt, and simultaneously the belt would further rotate the second screw nut pulley 146b so as to rotate the ball spline nut 133 as well, such that the ball spline nut 133 and the second shaft portion 142a of the second driving member 142 can rotate synchronously. Thereupon, in this embodiment, through the first driving member 141 and second driving member 142 to rotate the two different kinds of the ball screw nut 132 and the ball spline nut 133, respectively, the ball screw spline shaft 131 can rotate and displace linearly or spirally.

For example, if the second driving member 142 does not rotate the second shaft portion 142a, and the first driving member 141 rotates the first shaft portion 141a in a clockwise direction (not shown in the figure), the first shaft portion pulley 145a would be rotated in the clockwise direction to drive the belt to move and further to rotate the ball screw nut 132 as well, such that the ball screw nut 132 and the first shaft portion 141a can rotate synchronously in the clockwise direction. The ball screw nut 132 rotates about the ball screw spline shaft 131 in the clockwise direction so as to drive the ball screw spline shaft 131 to move downward axially along the ball screw spline shaft 131 in the vertical direction Z. Namely, the ball screw spline shaft 131 would move toward the lower base 137. It shall be explained that the clockwise direction is a specific rotation direction of the second rotation direction C.

On the other hand, if the second driving member 142 does not rotate the second shaft portion 142a, and the first driving member 141 rotates the first shaft portion 141a in a counter clockwise direction (reverse to the clockwise direction), the first shaft portion pulley 145a would be rotated in the counter clockwise direction to drive the belt to move and further to rotate the ball screw nut 132 as well, such that the ball screw nut 132 and the first shaft portion 141a can rotate synchronously in the counter clockwise direction. The ball screw nut 132 rotates about the ball screw spline shaft 131 in the counter clockwise direction so as to drive the ball screw spline shaft 131 to move upward axially along the ball screw spline shaft 131 in the vertical direction Z. Namely, the ball screw spline shaft 131 would move away from the lower base 137.

In some other embodiments, if the first driving member 141 rotates the first shaft portion 141*a* in a clockwise direction, the second driving member 142 rotates the second shaft portion 142*a* in a clockwise direction, and rotation speeds for the first shaft portion 141*a* and the second shaft portion 142*a* are defined to be the same, then the first shaft portion 141*a* would be rotated in the clockwise direction to drive the first shaft portion pulley 145*a* to rotate in the clockwise direction and further to drive the belt to move and the ball screw nut 132 to rotate as well, such that the ball screw nut 132 and the first shaft portion 141*a* can rotate synchronously in the clockwise direction. The ball screw nut 132 rotates about the ball screw spline shaft 131 in the clockwise direction. Simultaneously, the second shaft portion 142*a* rotates in the clockwise direction so as to drive the second shaft portion pulley 146*a* to rotate in the clockwise direction, and the rotation of the second shaft portion pulley 146*a* drives the belt to move. At the same time, the belt rotates the ball spline nut 133. Thus, the ball spline nut 133 and the second shaft portion 142*a* can rotate synchronously in the clockwise direction, and the ball spline nut 133 rotates about the ball screw spline shaft 131 in the clockwise direction.

Upon such an arrangement, when both the ball screw nut 132 and the ball spline nut 133 rotate about the ball screw spline shaft 131 in the clockwise direction, the ball screw spline shaft 131 would be driven to rotate axially in the clockwise direction, in which the clockwise direction can be a first rotation direction C1 of the second rotation direction C. Contrarily, the first driving member 141 drives the first shaft portion 141*a* to rotate in the counter clockwise direction, and simultaneously the second driving member 142 drives the second shaft portion 142*a* to rotate in the counter clockwise direction, such that the ball screw spline shaft 131 is driven to rotate axially in the counter clockwise direction. Here, the counter clockwise direction is reverse to the clockwise direction. According to the foregoing definition of the clockwise direction, the counter clockwise direction can be a second rotation direction C2 of the second rotation direction C, in which the second rotation direction C2 is reverse to the first rotation direction C1.

In some other embodiments, if the first driving member 141 does not rotate the first shaft portion 141*a*, but the second driving member 142 drives the second shaft portion 142*a* to rotate in a clockwise direction and to further rotate the second shaft portion pulley 146*a* in the clockwise direction, then the second shaft portion pulley 146*a* is driven to move the belt, and simultaneously the belt rotates the ball spline nut 133 to rotate synchronously the second shaft portion 142*a* in the clockwise direction. The ball spline nut 133 drives the ball screw spline shaft 131 to rotate in the clockwise direction, and the ball screw spline shaft 131 is thus driven to displace axially upward in the vertical direction Z and simultaneously to rotate in the clockwise direction, so that the ball screw spline shaft 131 undergoes a screw motion to move away from the lower base 137. On the other hand, if the first driving member 141 does not rotate the first shaft portion 141*a*, and the second driving member 142 drives the second shaft portion 142*a* to rotate in a counter clockwise direction, then the ball screw spline shaft 131 is driven to displace axially downward in the vertical direction Z and to rotate simultaneously in the counter clockwise direction, so that the ball screw spline shaft 131 undergoes a screw motion toward the lower base 137.

TABLE 1

| Case No. | Input: First shaft portion pulley 145a rotates ball screw nut 132 | Input: Second shaft portion pulley 146a rotates ball spline nut 133 | Motion of ball screw spline shaft 131 |
|---|---|---|---|
| 1 | Ball screw nut 132 rotates about ball screw spline shaft 131 in clockwise direction (first rotation direction C1 of FIG. 3) | Not happen | Linear downward motion |
| 2 | Ball screw nut 132 rotates about ball screw spline shaft 131 in counter clockwise direction (second rotation direction C2 of FIG. 3) | Not happen | Linear upward motion |
| 3 | Ball screw nut 132 rotates about ball screw spline shaft 131 in clockwise direction (first rotation direction C1 of FIG. 3) | Ball spline nut 133 rotates about ball screw spline shaft 131 in clockwise direction (first rotation direction C1 of FIG. 3), and ball spline nut 133 and ball screw nut 132 have the same rotation speed | Rotation in clockwise direction (first rotation direction C1 of FIG. 3) |
| 4 | Ball screw nut 132 rotates about ball screw spline shaft 131 in counter clockwise direction (second rotation direction C2 of FIG. 3) | Ball spline nut 133 rotates about ball screw spline shaft 131 in counter clockwise direction (second rotation direction C2 of FIG. 3), and ball spline nut 133 and ball screw nut 132 have the same rotation speed | Rotation in counter clockwise direction (second rotation direction C2 of FIG. 3) |
| 5 | Not happen | Ball spline nut 133 rotates about ball screw spline shaft 131 in clockwise direction (first rotation direction C1 of FIG. 3) | Upward screw motion |
| 6 | Not happen | Ball spline nut 133 rotates about ball screw spline shaft 131 in counter clockwise direction (second rotation direction C2 of FIG. 3) | Downward screw motion |

By summarizing the aforesaid motions into Table 1, with the parallel arrangement of the motor shafts (the first shaft portion 141*a* of the first driving member 141 and the second shaft portion 142*a* of the second driving member 141) and the ball screw spline shaft 131 in accordance with this disclosure, the height of the support mechanism 10 can be significantly reduced. By having the belt and the pulley (the first transmission element 145 and the second transmission element 146) to drive the ball screw nut 132 and the ball spline nut 133 to rotate about the ball screw spline shaft 131, different rotation combinations of the ball screw nut 132 and the ball spline nut 133 (in different moving directions, rotation directions and rotation speeds) can be applied to have the ball screw spline shaft 131 to undergo a rotational, linear or screw motion.

In this embodiment, the detecting element 15 can determine in advance whether or not the first bevel gear 112 is meshed with the second bevel gear 127. If the second bevel gear 127 does not mesh the first bevel gear 112, then the first driving member 141 can drive the ball screw nut 132 to rotate so as to have the ball screw spline shaft 131 to undergo the up-and-down lifting motion in the vertical direction Z. Since the supportive base 123 of the rotating unit 12 moves together with the ball screw spline shaft 131, thus the rotating unit 12 would undergo the up-and-down lifting motion synchronously along the ball screw spline shaft 131 in the vertical direction Z. Thereupon, the relative vertical distance between the rotating unit 12 and the fixed body member 11 can be adjusted, or the rotating unit 12 can be moved downward to have the second bevel gear 127 to mesh the first bevel gear 112.

In this embodiment, when the second bevel gear 127 is meshed with the first bevel gear 112, the first driving member 141 would rotate the ball screw nut 132, and simultaneously the second driving member 142 would rotate the ball spline nut 133. With both the ball screw nut 132 and the ball spline nut 133 to rotate about the ball screw spline shaft 131 simultaneously, then, by adjusting the rotation speed of the first shaft portion 141a of the first driving member 141 and the rotation speed of the second shaft portion 142a of the second driving member 142, the ball screw nut 132 and the ball spline nut 133 can have the same rotation speed to rotate the ball screw spline shaft 131 axially in the second rotation direction C. The rotating unit 12 would rotate with the ball screw spline shaft 131 in the second rotation direction C, and simultaneously the rotating unit 12 is driven to rotate the second bevel gear 127 and to mesh the second bevel gear 127 with the first bevel gear 112. By having the second bevel gear 127 to rotate the rotational shaft 124, the main body 121 can rotate about the rotational shaft 124 in the first rotation direction A with respect to the fixed body member 11. In other words, while the rotating unit 12 rotates about the ball screw spline shaft 131 in the second rotation direction C, the rotation angle of the rotating unit 12 with respect to the fixed body member 11 in the first rotation direction A can be adjusted through the meshing between the second bevel gear 127 and the first bevel gear 112. In addition, the brake element 128 can be used to fix the rotating unit 12 at a specific rotation angle in the first rotation direction A with respect to the fixed body member 11.

In this embodiment, by having the first driving member 141 to rotate the ball screw nut 132 about the ball screw spline shaft 131, the ball screw spline shaft 131 would undergo the up-and-down lifting motion axially in the vertical direction Z, and the rotating unit 12 would move together with the ball screw spline shaft 131. Thereupon, the relative vertical distance between the rotating unit 12 and the fixed body member 11 can be adjusted to conform different heights of various workpieces. Further, through the synchronous rotation of the ball screw nut 132 and the ball spline nut 133, the rotating unit 12 can rotate about the ball screw spline shaft 131 in the second rotation direction C, such that the rotation angle of the rotating unit 12 with respect to the fixed body member 11 can be adjusted to meet different curved surfaces of various workpieces.

By summarizing the aforesaid descriptions, columns 1-5 of Table 2 demonstrate the steps of adjusting the supportive element 30 in a time sequence.

TABLE 2

| Step 1 | Step 2 | Step 3 | Step 4 | Step 5 |
|---|---|---|---|---|
| First bevel gear 112 meshes second bevel gear 127 | Rotating unit 12 is rotated by a rotation angle in first rotation direction A | Rotating unit 12 is moved in vertical direction Z | Rotating unit 12 is rotated by another rotation angle in second rotation direction C | Workpiece is supported |

As described above, the support mechanism of this disclosure does not need three driving units anymore, but utilizes specific structure arrangement to reduce the number of the driving units. In one embodiment of this disclosure, only two driving units are applied to adjust the triaxial freedom (the first rotation direction, the second rotation direction and the vertical direction). Thereupon, workpieces with different heights and curved surfaces can be firmly and stably supported by the support mechanism of this disclosure.

Further, this disclosure utilizes two different types of screw nuts to pair the ball screw spline shaft, and thus different rotation pairs can be provided to drive the ball screw spline shaft to undergo rotations, linear motions or screw motions.

In addition, the driving unit and the moving unit of this disclosure are paired into a parallel arrangement, not a coaxial arrangement, and thus the entire height of the support mechanism can be reduced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A support mechanism, comprising:
a fixed body member;
a rotating unit, mounted to the fixed body member, used for rotating with respect to the fixed body member;
a moving unit, disposed at the fixed body member, including a ball screw spline shaft, a ball screw nut and a ball spline nut, the ball screw nut being rotatably disposed at the ball screw spline shaft, the ball spline nut being rotatably disposed also at the ball screw spline shaft, the ball screw spline shaft being moved together with the rotating unit; and
a driving unit, disposed at the fixed body member, including a first driving member and a second driving member, the first driving member being to rotate the ball screw nut, the second driving member being to rotate the ball spline nut;
wherein, with different rotation pairs of the ball screw nut and the ball spline nut to the ball screw spline shaft, the ball screw spline shaft is driven to correspondingly move, and the ball screw spline shaft is further driven to move the rotating unit;
wherein the fixed body member includes a first bevel gear, and the rotating unit includes a second bevel gear;
wherein, when the rotating unit rotates axially about the ball screw spline shaft, a rotation angle of the rotating unit with respect to the fixed body member is adjusted through meshing between the first bevel gear and the second bevel gear.

2. The support mechanism of claim 1, wherein the first bevel gear is fixed to the fixed body member, the rotating unit includes a main body, a supportive base and a rotational shaft, one end of the ball screw spline shaft connects the supportive base, the rotational shaft penetrates the supportive base, an axial direction of the rotational shaft is perpendicular to another axial direction of the ball screw spline shaft, the main body connects the rotational shaft, and one end of the rotational shaft penetrates the second bevel gear.

3. The support mechanism of claim 2, further including a brake element connected with another end of the rotational shaft, the brake element being used for fixing the rotational shaft so as to provide the rotating unit the rotation angle with respect to the fixed body member.

4. The support mechanism of claim 2, further including a supportive element connected with the main body, the supportive element being one of a suction cup, an electromagnetic valve and a claw.

5. The support mechanism of claim 1, further including a detecting element connected with the fixed body member, the detecting element being used for determining whether or not the first bevel gear is meshed with the second bevel gear.

6. The support mechanism of claim 1, wherein the ball screw spline shaft has an axial direction parallel to another axial direction of the driving unit.

7. The support mechanism of claim 1, wherein the driving unit includes a first transmission element and a second transmission element, the first driving member includes a first shaft portion, the second driving member includes a second shaft portion, the first transmission element connects the first shaft portion and the ball screw nut, and the second transmission element connects the second shaft portion and the ball spline nut.

8. The support mechanism of claim 7, wherein the first transmission element is a combination of belts and pulleys, and the second transmission element is another combination of belts and pulleys.

9. The support mechanism of claim 7, wherein an axial direction of the first shaft portion is parallel to another axial direction of the ball screw spline shaft, and a further axial direction of the second shaft portion is parallel to the another axial direction of the ball screw spline shaft.

10. The support mechanism of claim 1, wherein each different rotation pair specifies different combinations of driving, rotation directions and rotation speeds for the ball screw nut and the ball spline nut.

11. The support mechanism of claim 1, wherein the moving unit includes a screw nut fixation base fixed to the fixed body member, the screw nut fixation base is fixed to corresponding flanges of the ball screw nut and the ball spline nut, and the ball screw spline shaft is movably mounted inside the screw nut fixation base.

12. The support mechanism of claim 1, wherein the ball screw nut rotates about the ball screw spline shaft via a first bearing element, and the ball spline nut rotates about the ball screw spline shaft via a second bearing element.

13. The support mechanism of claim 1, wherein the ball screw spline shaft includes a spiral groove and a linear groove, the ball screw nut rotates along the linear groove, and the ball spline nut rotates along the spiral groove.

* * * * *